United States Patent
Terry et al.

(10) Patent No.: US 6,418,719 B2
(45) Date of Patent: Jul. 16, 2002

(54) CONTROL OF A VARIABLE GEOMETRY TURBOCHARGER BY SENSING EXHAUST PRESSURE

(75) Inventors: Wesley J. Terry, Union, IL (US); Mathew J. Seiberlich, Kenosha, WI (US); Brian J. Murphy, Chicago, IL (US)

(73) Assignee: International Engine Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/766,384

(22) Filed: Jan. 19, 2001

Related U.S. Application Data
(60) Provisional application No. 60/178,071, filed on Jan. 25, 2000.

(51) Int. Cl.[7] ............................................. F02D 23/00
(52) U.S. Cl. ............................................ 60/602; 60/600
(58) Field of Search ........................... 60/600, 601, 602, 60/603

(56) References Cited

U.S. PATENT DOCUMENTS

| | | | |
|---|---|---|---|
| 4,685,302 A | 8/1987 | Abo et al. | |
| 4,756,161 A | 7/1988 | Hirabayashi | |
| 4,779,423 A | 10/1988 | Szczupak | |
| 5,123,246 A | 6/1992 | Younessi et al. | |
| 5,228,292 A | 7/1993 | Hanauer et al. | |
| 5,771,867 A | 6/1998 | Amstutz et al. | |
| 5,850,737 A | 12/1998 | Aschner et al. | |
| 5,867,986 A | 2/1999 | Buratti et al. | |
| 6,000,221 A | 12/1999 | Church et al. | |
| 6,058,708 A | * 5/2000 | Heinitz et al. | ................. 60/602 |
| 6,067,800 A | 5/2000 | Kolmanovsky et al. | |
| 6,128,902 A | 10/2000 | Kolmanovsky et al. | |
| 6,134,890 A | 10/2000 | Church et al. | |
| 6,203,272 B1 | 3/2001 | Walsham | |

FOREIGN PATENT DOCUMENTS

| | | |
|---|---|---|
| DE | 197 32 642 A1 | 2/1999 |
| DE | 198 14 572 A1 | 10/1999 |
| EP | 0 599 321 A1 | 6/1999 |
| WO | WO 97/45633 | 12/1997 |

* cited by examiner

*Primary Examiner*—Hoang Nguyen
(74) *Attorney, Agent, or Firm*—Dennis Kelly Sullivan; Jeffrey P. Calfa; Neil T. Powell

(57) ABSTRACT

There is provided a system and method for using an engine's exhaust back pressure to control a variable geometry turbocharger. The control system determines a desired exhaust back pressure based on engine speed and engine load. The desired exhaust back pressure is compared with a measured exhaust back pressure to determine the difference between the measured and desired exhaust back pressures. The difference value is used to determine the duty cycle. In an alternate embodiment, the exhaust gas pressure is used to adjust the duty cycle determined by other operating parameters. A base duty cycle is determined from the engine speed and the engine load. The difference between the measured and desired exhaust back pressures is used to determine an exhaust pressure control duty cycle. The base duty cycle is then adjusted by the exhaust pressure control duty cycle to give a turbocharger duty cycle.

48 Claims, 16 Drawing Sheets

CONTROL OF A VARIABLE GEOMETRY TURBOCHARGER BY SENSING EXHAUST PRESSURE

This patent application claims the benefit of Provisional U.S. patent application Ser. No. 60/178,071 filed on Jan. 25, 2000.

FIELD OF THE INVENTION

This invention relates generally to control systems for turbochargers. More particularly, this invention relates to control systems that sense the exhaust gas pressure to control variable geometry turbochargers on internal combustion engines.

BACKGROUND OF THE INVENTION

Many internal combustion engines use turbochargers to improve engine performance. A turbocharger increases the density of the intake air into the engine. The higher density air increases the amount of fuel the engine may combust. As a result, the power output of the engine increases.

Turbochargers typically have a turbine and a compressor connected by a common shaft. The turbine has blades attached to a wheel, which is mounted on the shaft. A turbine housing encloses the turbine and connects to the exhaust gas manifold of the engine. The turbine housing has vanes for directing the exhaust gases against the turbine blades. The compressor has blades attached to another wheel, which also is mounted on the shaft. A compressor housing encloses the compressor and connects to the intake air manifold of the engine. The compressor housing has vanes for assisting the compressor to pressurize intake air. The compressor housing is isolated from the turbine housing.

In operation, exhaust gases pass through the exhaust gas manifold into the turbine housing. The vanes in the turbine housing direct the exhaust gases against the turbine blades. The exhaust gas pressure causes the turbine to spin, which causes the compressor to spin. The spinning compressor pressurizes the intake air. As a result, higher density air is provided to the intake air manifold.

In a turbocharger, the exhaust gas pressure has a direct effect on the intake air pressure. As the exhaust gas pressure increases, the turbine and consequently the compressor spin faster. A faster spinning compressor increases the intake air pressure. The opposite effect occurs as the exhaust gas pressure decreases.

Many turbochargers have a fixed geometry. The vanes in the turbine and compressor housings are stationary. By design, a fixed-geometry turbocharger operates efficiently at a particular engine speed and load. Conversely, it operates less efficiently at engine speeds and loads for which it is not designed.

At low engine speeds, the exhaust gas pressure is low. It may be below the minimum necessary for operating the turbine. As the engine accelerates from idle or slow speeds, there is a delay from the time when the engine load increases to the time when there is sufficient exhaust gas pressure to spin the turbine. Even when the turbine spins, the exhaust gas pressure may not reach a high enough pressure fast enough to spin the turbine as fast as it is necessary for the compressor to produce the desired intake air pressure.

The exhaust gas pressure increases as engine speed increases. At some point, the pressure becomes high enough to overpower the turbocharger. An overpowered turbocharger reduces engine performance. Additionally, the high exhaust pressure associated with an overpowered turbocharger may cause the turbocharger to fail from fatigue, broken seals, and similar problems.

To improve efficiency, fixed-geometry turbochargers are sized to provide high compressor speeds at low engine speeds. The vanes in the turbine housing usually narrow to increase the exhaust gas pressure. The vanes also direct the exhaust gas flow toward a portion of the turbine blades. While these changes improve the performance of the turbocharger at low engine speeds, they adversely affect the performance of the turbocharger at high engine speeds. The narrowing of the vanes lowers the exhaust gas pressure at which the turbocharger becomes overdriven.

To avoid overdriving, fixed-geometry turbochargers have a waste gate or similar valve positioned between the turbine and the exhaust gas manifold. When the exhaust gas pressure reaches a certain level, the waste gate opens to divert exhaust gases away from the turbine. This approach responds and corrects for an overdriving condition. However, it waits for the condition to occur before responding. It also wastes energy and requires additional equipment.

New turbocharger designs have a variable geometry. The turbine and/or compressor housings have variable nozzles, which move to change the flow area and flow direction. In many designs, only the turbine has variable nozzles.

A variable nozzle turbine (VNT) turbocharger typically has curvilinear nozzles, which rotate between open and closed positions about a pivot. In some designs, the closed position leaves a small gap between the nozzles. In other designs, the nozzles touch when they are closed, which essentially stops the flow of exhaust gas to the turbine. The nozzles connect to each other by a ring or similar apparatus to move in unison. An electronic control module sends an electronic signal to activate a solenoid, pneumatic valve, or similar device.

When the exhaust gas pressure is low, the nozzles close to create a narrower area for the exhaust gases to flow. The narrower area restricts gas flow through the turbine housing, thus increasing exhaust gas pressure. The nozzles also direct the exhaust gases optimally at the tips of the turbine blades. The directed flow and higher pressure enables the turbine to start spinning sooner and at a faster rate. As a result, a VNT turbocharger provides the high compressor speeds desired at low engine speeds.

As the exhaust gas pressure increases, the nozzles open to reduce the restriction to the gas flow. The gas flow also is directed toward the entire length of the turbine blades. With less restriction and broader gas flow, the turbine and consequently the compressor spins slower than if the nozzles were closed under these conditions. As a result, the turbocharger is able to respond and correct for overdriven conditions.

Proper nozzle control is necessary to optimize performance of a VNT turbocharger. Internal combustion engines, especially those in vehicles, have constantly changing demands. One moment, the engine is at low speed. The next moment, the engine is at high speed. Engine load and other parameters change almost constantly. Accordingly, the nozzles must adjust to new operating conditions quickly. If the nozzles delay closing, such as when the engine goes from high to low speeds, the turbocharger will not provide the desired intake air pressure. If the nozzles delay opening, such as when the engine goes from low to high speeds, the turbocharger will be overdriven.

In most designs, VNT turbochargers are controlled by the intake air pressure. The measured intake air pressure is compared to a desired intake air pressure. A sensor is located in the intake air manifold to determine the measured intake air pressure. The engine's electronic control module (ECM) or other microprocessor determines the desired intake air pressure based on engine operating parameters such as engine speed, engine load, ambient air pressure, etc. If the measured intake pressure is higher then the desired intake pressure, the ECM opens the nozzles until the measured and desired intake pressures are equal. Conversely, if the measured intake pressure is lower than the desired intake pressure, the ECM closes the nozzles until the intake pressures are equal.

To open or close nozzles, the ECM sends an electric signal to the solenoid, pneumatic valve, or other device controlling the nozzles. The strength of the electric signal or duty cycle determines the position of the nozzles. The duty cycle is a percentage of the total electrical signal necessary to move the nozzles into their closed position. While the duty cycle is indicative of the nozzle position, the duty cycle for a particular nozzle position varies from turbocharger to turbocharger.

Intake air pressure is not suitable for optimizing the performance of a VNT turbocharger. Generally, the intake air pressure increases as the nozzles close. However, there is position where the intake air pressure reaches a maximum level and then decreases if the nozzles close further.

FIG. 1 shows the relationship between the intake air pressure and the turbine duty cycle (nozzle position). As the turbine duty cycle increases from 20 to 60 percent, the intake air pressure increases from 7 to 28 in. Hg. As the turbine duty cycle increases above 60 percent, the intake air pressure decreases. The nozzles have restricted the flow of gases to the turbine sufficiently to slow the compressor. Consequently, the intake air pressure decreases to 19 in. Hg at a duty cycle of 80 percent. At this point and beyond, the nozzles are closed.

As the nozzles close beyond the position of maximum air intake pressure, they prevent exhaust gases from flowing across the turbine. The turbine and compressor turn slower with less exhaust gas flow. However, the exhaust gas pressure increases dramatically. This combination of a slower compressor and higher exhaust gas pressure decreases the engine torque and increases fuel consumption. The turbocharger is providing excess exhaust pressure to the engine. The excess exhaust pressure effectively "steals" work from the engine to produce the high exhaust gas pressure. It turns the engine into an air compressor, thus diverting power from the transmission.

The maximum intake air pressure is dependent largely upon the exhaust gas volume. At lower engine speeds, the maximum intake air pressure occurs at higher duty cycles (the nozzles are more closed). At higher engine speeds, the maximum intake air pressure occurs at lower duty cycles (the nozzles are more open). This affect is more noticeable on VNT turbochargers where the nozzles close completely.

It is difficult to control a VNT turbocharger based on the intake air pressure. At many intake air pressures, the ECM cannot properly determine whether to open or close the nozzles. For example in FIG. 1, an intake air pressure of 25 in. Hg occurs at two duty cycles. Depending on the duty cycle, opening the nozzles may decrease or increase the intake air pressure. Similarly, closing the nozzles also may decrease or increase the intake air pressure. The problem worsens if the turbocharger has nozzles that close completely.

In addition to control problems, controllers based on the intake air pressure do not identify and address the excessive exhaust gas pressure conditions when the turbocharger may be overdriven. These conditions may occur prior to the intake air pressure reaching a maximum.

To address excessive exhaust gas pressure, some turbochargers include an exhaust gas pressure sensor in the exhaust gas manifold. In one approach, the ECM opens the nozzles when the exhaust gas pressure reaches a certain level. The ECM keeps opening the nozzles until the exhaust gas pressure returns to a proper level. Another design compares the intake air pressure with the exhaust gas pressure. When the difference between the pressures reaches a certain level, the ECM opens the nozzles until the difference returns to a proper level.

While these approaches respond to excessive exhaust gas pressure, they do so after the overdriving conditions already exist. They also require additional equipment, namely a sensor and associated control interfaces. In addition, they create a "seesaw" effect when operating the turbocharger. When the intake air pressure is lower than the desired intake air pressure, the ECM closes the nozzles. This action increases the exhaust gas pressure to drive the turbine and compressor faster. When the exhaust gas pressure exceeds a certain level, the ECM opens the nozzles to reduce the exhaust gas pressure. At that point, if the measured intake air pressure is below the desired intake air pressure, the ECM closes the nozzles to increase the intake air pressure. This seesaw effect continues until the operating parameters of the engine change.

In another design, a VNT turbocharger is controlled by sensing the position of the variable vanes. A predetermined map provides a desired vane position based upon engine conditions such as engine speed and load. As these engine conditions change, the variable vanes are moved to the desired vane position for those conditions. Theoretically, the desired vane position should provide the desired intake boost pressure. However, the vane position does not adequately adjust for the variability in exhaust gas volume and pressure associated with changing engine conditions. In addition, the vane position to intake boost pressure relationship will have errors unless manufacturing tolerances are small between turbochargers.

Accordingly, there is a need for a turbocharger control system that maximizes the available intake boost pressure while avoiding excessive exhaust gas pressure and overdriving conditions under variable and changing engine operations.

SUMMARY OF THE INVENTION

The present invention provides a system and method for using an engine's exhaust back pressure to control a variable geometry turbocharger. The control system determines a desired exhaust back pressure based on engine speed and engine load. The desired exhaust back pressure is compared with a measured exhaust back pressure to determine the difference between the measured and desired exhaust back pressures. The difference between the desired and measured pressures is used to determine the duty cycle for the turbocharger.

The exhaust back pressure provides greater controllability over the prior art. This enhanced controllability enables additional embodiments for controlling turbochargers with cold weather warm-up, engine braking, and exhaust gas recirculation (EGR) capabilities. In cold weather, "extra" exhaust pressure will cause the engine to increase fuel consumption thus shortening the time to warm-up of the engine.

During braking, the engine may be used to slow the vehicle. Higher exhaust gas pressures increase negative torque and thus slow the engine. The decrease in engine speed slows the vehicle when the transmission is engaged. Engine braking is desirous to augment cruise control. For engines with EGR, the control system ensures the exhaust gas pressure is always higher than the intake air pressure. This enables the exhaust gas to enter the intake air manifold as desired. It also avoids additional equipment associated with EGR.

While these embodiments use the exhaust back pressure to determine the duty cycle for the turbocharger, an alternate embodiment uses the exhaust gas pressure to adjust the duty cycle determined by other operating parameters. In the alternate embodiment, a base duty cycle is determined from the engine speed and the engine load. The difference between the measured and desired exhaust back pressures is used to determine an exhaust pressure control duty cycle. The base duty cycle is then adjusted by the an exhaust pressure control duty cycle to provide an adjusted duty cycle to the turbocharger.

The following drawings and description set forth additional advantages and benefits of the invention. More advantages and benefits are obvious from the description and may be learned by practice of the invention.

BRIEF DESCRIPTION OF THE DRAWINGS

The present invention may be better understood when read in connection with the accompanying drawings, of which.

DETAILED DESCRIPTION OF THE INVENTION

Figure 1:
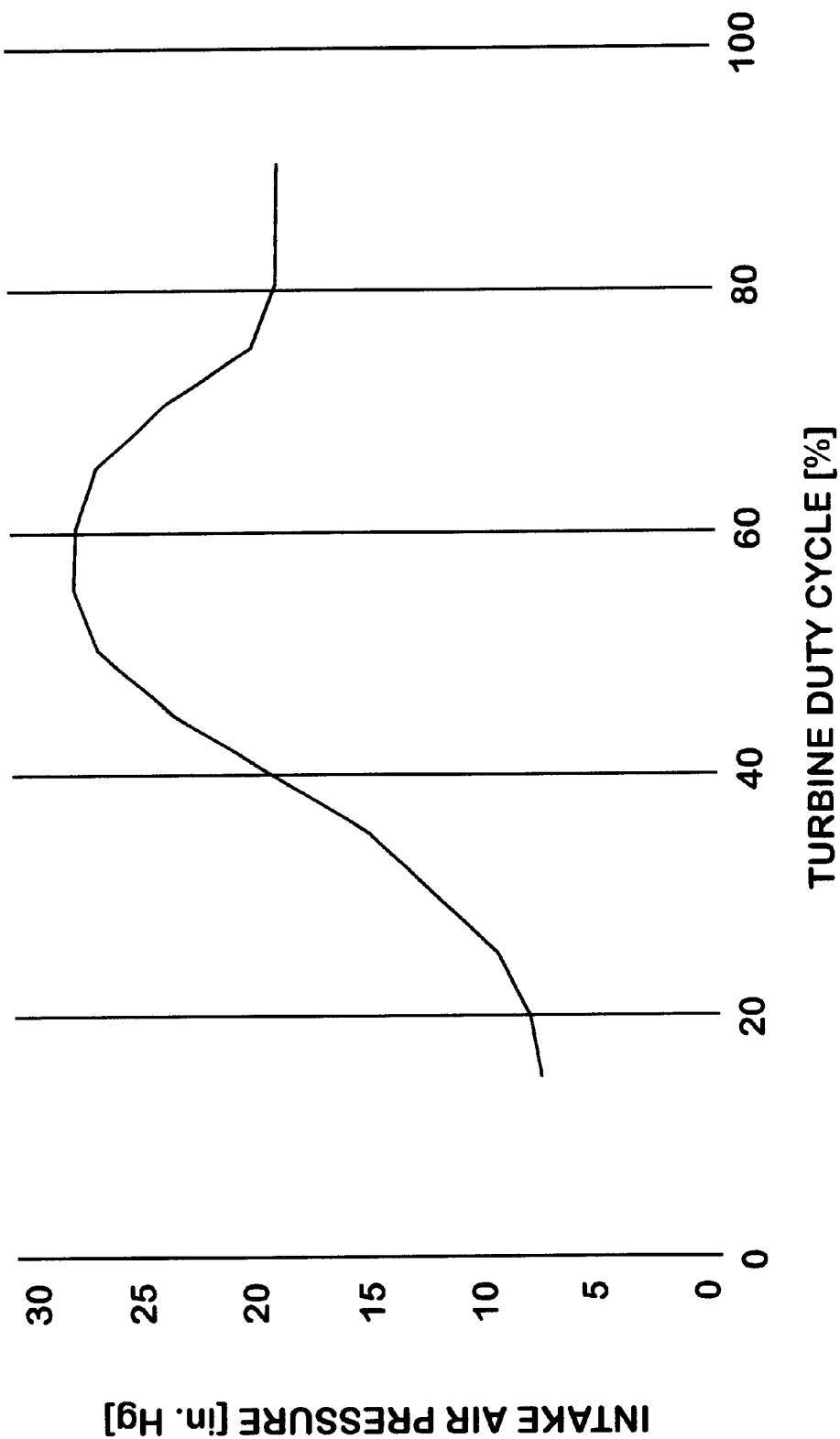
FIG. 1 is a chart comparing the intake air pressure to the turbine duty cycle for a VNT turbocharger.
Figure 2:
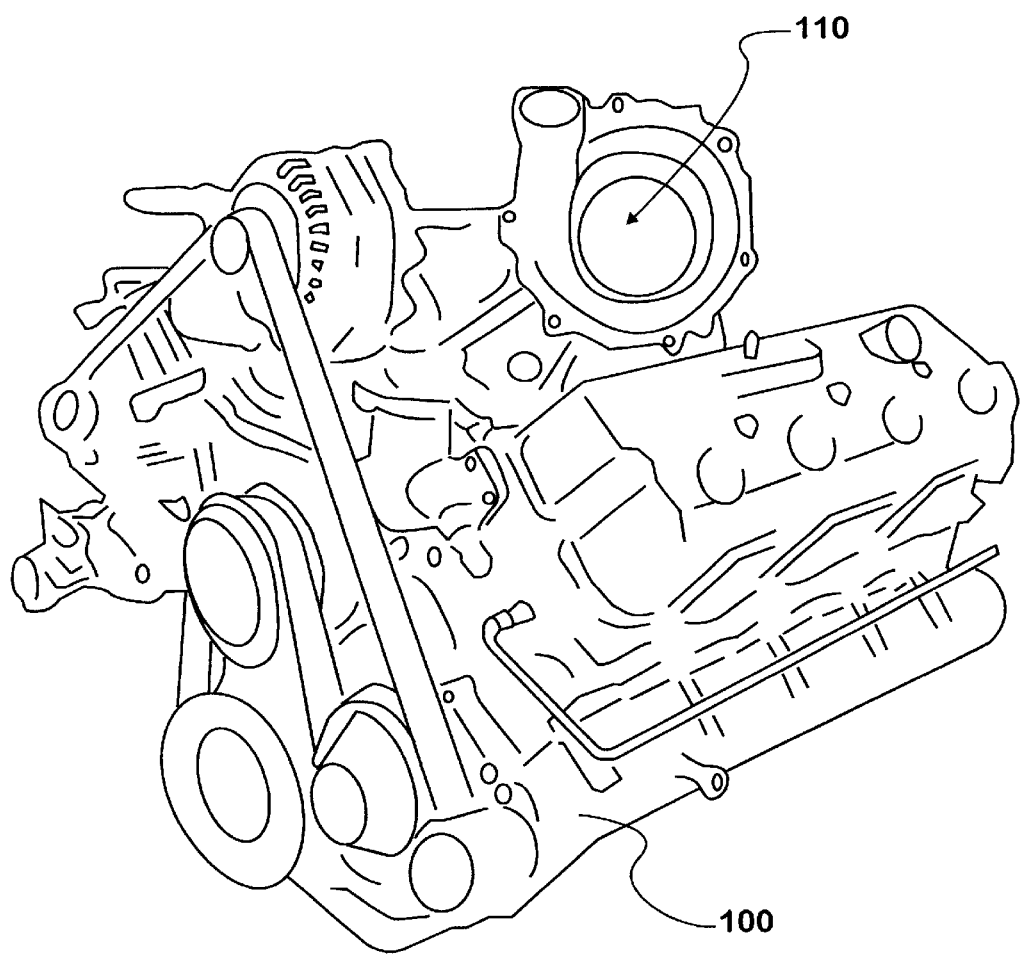
FIG. 2 is a perspective view of a diesel engine having a turbocharger with a turbocharger control system according to the present invention.
Figure 3:
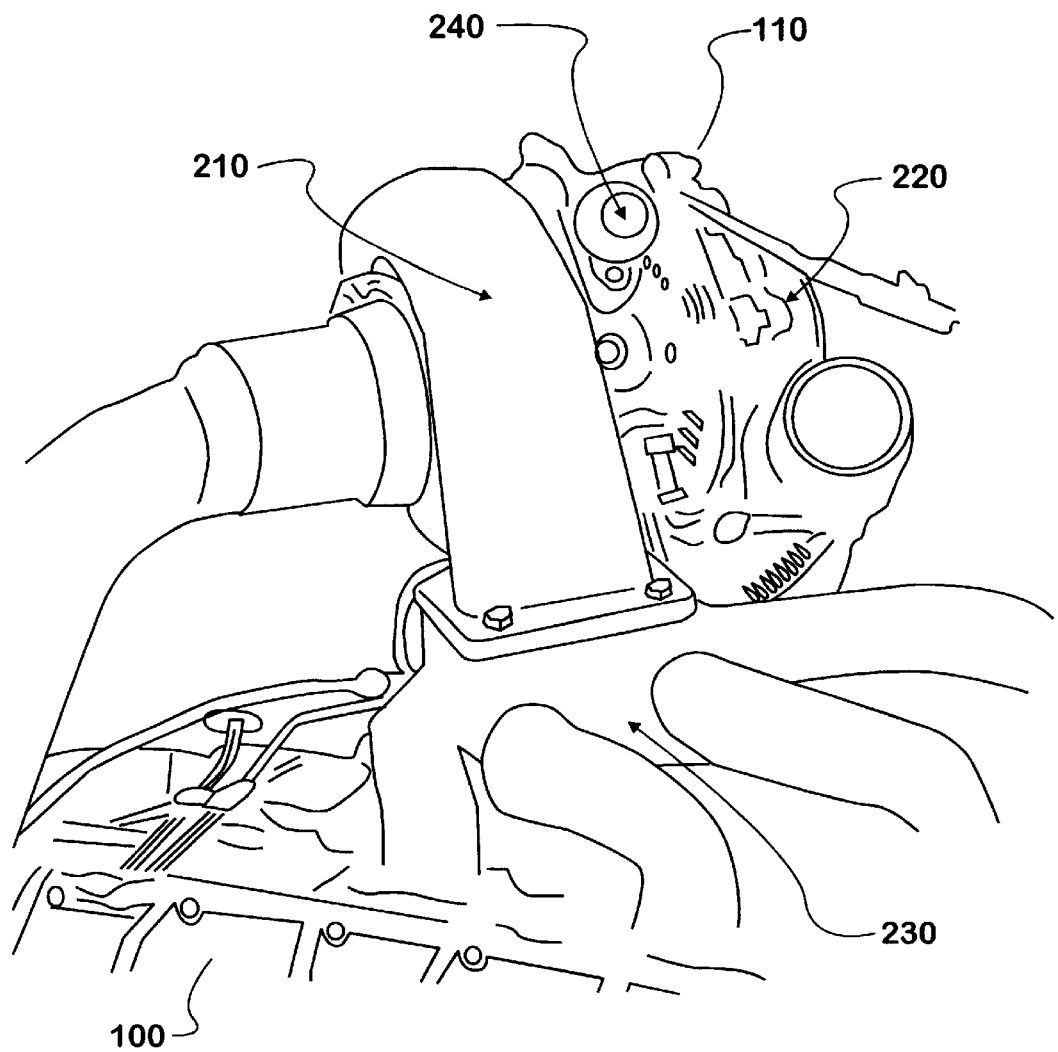
FIG. 3 is a close-up perspective view of the turbocharger in FIG. 2.
Figure 4:
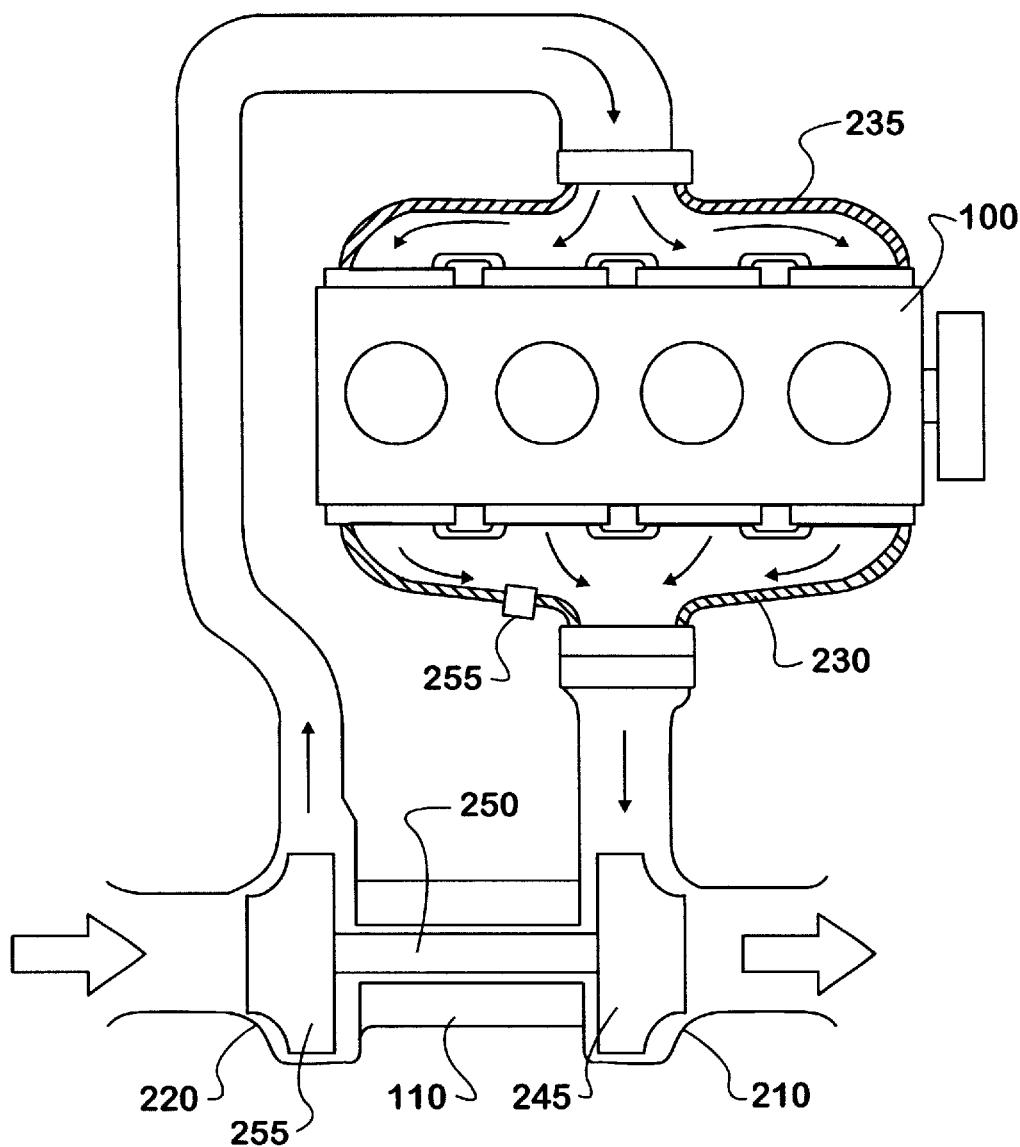
FIG. 4 is a schematic view of the turbocharger in FIG. 2.

FIGS. 2–4 show an internal combustion engine 100 having a turbocharger 110 controlled by sensing the exhaust gas pressure according to the present invention. FIG. 2 is a perspective view of the turbocharger 110 mounted on the engine 100. FIG. 3 is a close-up perspective. view of the turbocharger 110 in FIG. 2. FIG. 4 is a schematic view of the turbocharger 110 mounted on the engine 100 (only one side of the engine is shown).

The internal combustion engine 100 is a compression ignition or diesel engine with a v-configuration. The turbocharger 110 is a variable nozzle turbine (VNT) turbocharger. While FIG. 4 shows only four cylinders, the present invention may be used with any number of cylinders. Additionally, the engine may have a spark ignition and an in-line or other configuration. The present invention is applicable to any variable geometry turbocharger including those with variable compressor nozzles. While only one turbocharger is shown, the present invention may be applied to engines with multiple turbochargers.

The turbocharger 110 has a turbine housing 210 connected to a compressor housing 220. The turbine housing 210 is connected to the exhaust manifold 230 of the internal combustion engine 100. The compressor housing is connected to the air intake manifold 235. While the figures show a particular scheme for mounting turbocharger 110 on engine 100, other mounting schemes may be used.

The turbine housing 210 encloses a turbine 245 mounted on a shaft 250. The turbine has variable nozzles (not shown) operated by a control solenoid 240. A pneumatic valve or other control device may be used in place of the control solenoid 240. The control solenoid 240 opens and closes the nozzles, which have little or no gaps between them when they are closed completely. Other turbochargers may be used where the nozzles are not able to close completely.

The compressor housing 220 encloses a compressor 222 mounted on the shaft 250, which connects the compressor 222 to the turbine 245. Except for the shaft 250, the compressor housing 220 is isolated from the turbine housing 210. The compressor housing 220 has vanes (not shown) to assist in pressurizing the intake air for the engine 100. The vanes are optional and various types may be used.

An exhaust back pressure sensor 255 is operatively mounted on the exhaust manifold 230 for sensing the exhaust gas pressure. The exhaust back pressure sensor 255 provides a pressure signal indicating the measured exhaust back pressure to an electronic control module (not shown). While a sensor is used, other means may be used to determine and provide a signal of the exhaust back pressure. While the figures show a position for the exhaust back pressure sensor 255, it may be placed elsewhere on the exhaust gas manifold 230 and the portion of the turbine housing 210 connecting with the exhaust gas manifold 230.

The electronic control module provides a control signal to the control solenoid 240 to open and close the nozzles based upon the measured exhaust back pressure. The electronic control module may be the microprocessor used to control the engine. However, there maybe separate microprocessors to control the engine and the turbine. In that scenario, the engine microprocessor would be connected to the turbocharger microprocessor for monitoring and control purposes.

Figure 5:
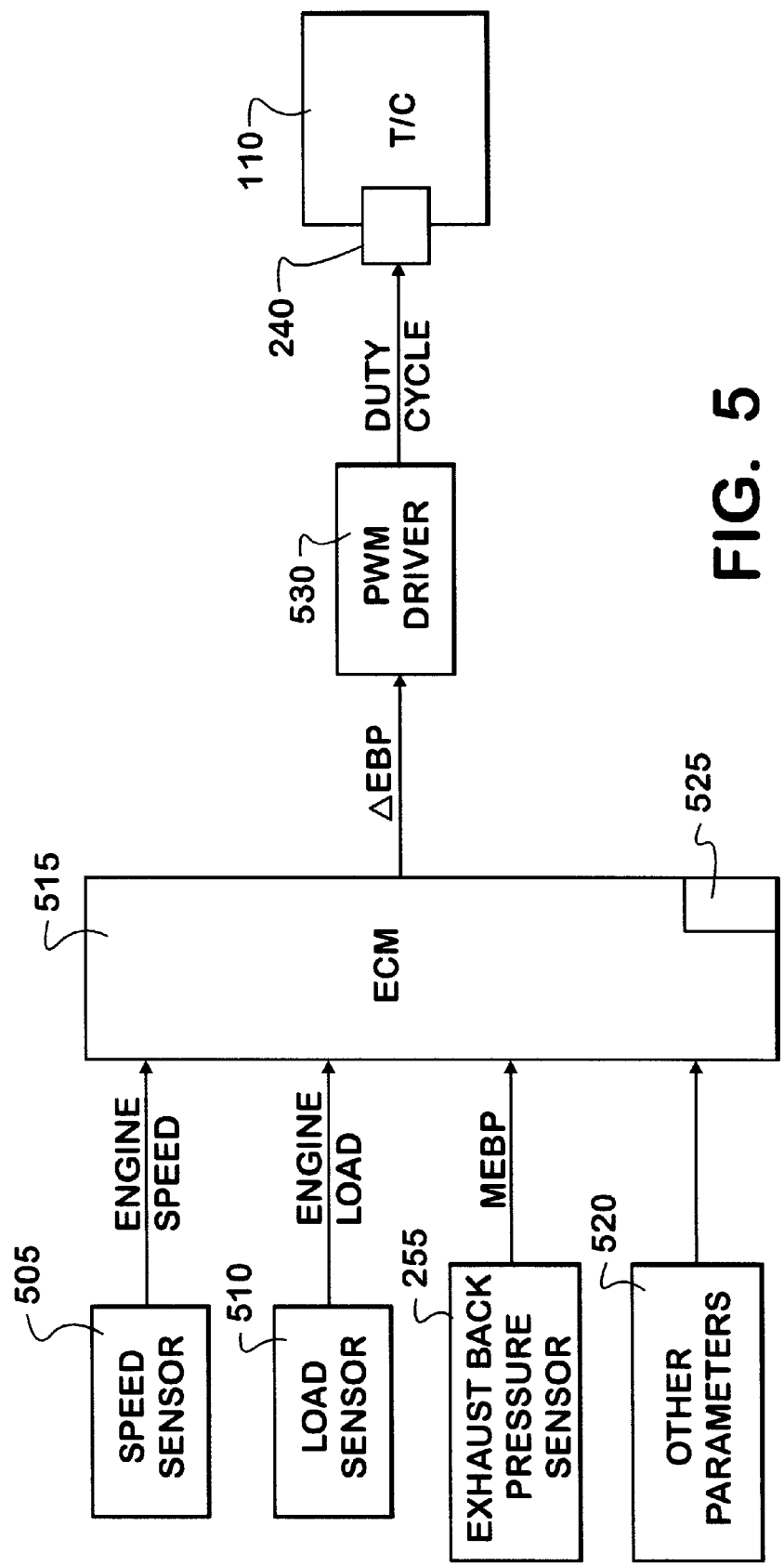
FIG. 5 is a block diagram of the turbocharger control interface according to the present invention.

FIG. 5 is a block diagram of the control interface for a turbocharger according to the present invention. A speed sensor 505 and a load sensor 510 provide electronic signals of the engine speed and engine load respectively to the electronic control module (ECM) 515. The exhaust back pressure sensor 255 provides an electronic signal of the measured exhaust back pressure (MEBP) to the ECM 515.

Other pre-determined engine parameters 520 may be provided to the ECM 515. The other pre-determined engine parameters 520 may include the ambient air pressure, the vehicle speed, the engine temperature, and other common operating parameters of the engine and vehicle.

While sensors are shown as providing electronic signals, other means may be used to provide the necessary inputs into the ECM 515. In addition, the inputs may be signals other than electronic signals such as magnetic or optical signals as long as the ECM 515 may interpret them to control the turbocharger.

The ECM 515 includes or is connected to electronic or data storage media 525, which are capable of temporary or permanent storage Such electronic or data storage media includes PROM, EPROM, EEPROM, flash memory, magnetic, optical, and combinations of these devices. The electronic or data storage media function in the control system as read-only memory, random access memory, keep-alive memory and the like.

The ECM 515 compares the measured exhaust back pressure (MEBP) with the desired exhaust back pressure (DEBP). The ECM 515 determines the DEBP by comparing the engine speed and engine load to map data in the electronic or data storage media 525. The ECM 515 determines the difference (ΔEBP) between the MEBP and the DEBP. Based on the ΔEBP, the ECM 515 provides a pulse width modulated signal to a pulse width modulated (PWM) driver 530. While a pulse width modulated signal and driver are used, other types of signals and drivers may be used.

The PWM driver 530 determines and provides a duty cycle to the control solenoid 240 on the turbocharger 110. The control solenoid 240 opens and closes the turbine nozzles based upon the duty cycle.

Figure 6:
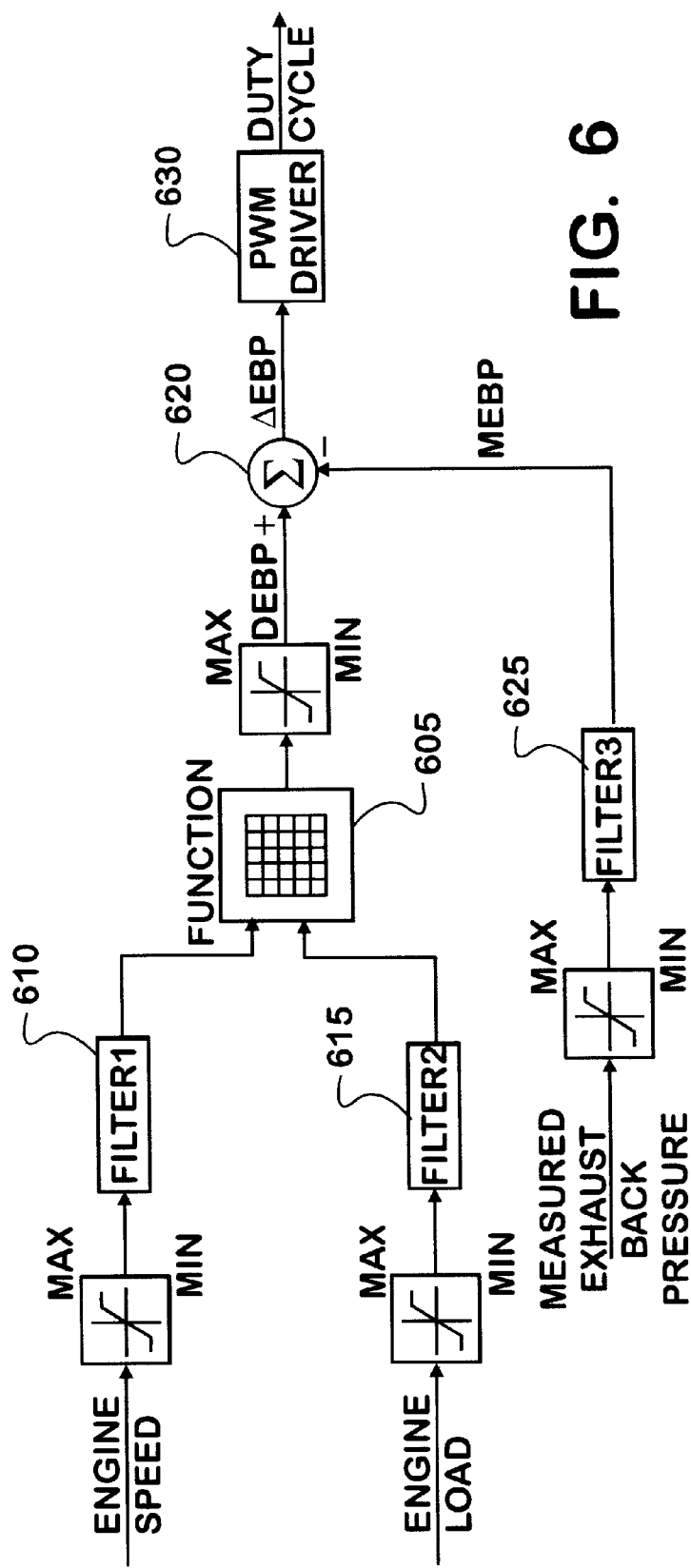
FIG. 6 is a block diagram showing a first embodiment of the closed-loop control strategy for a turbocharger according to the present invention.

FIG. 6 shows a first embodiment of the closed-loop control strategy for a turbocharger. according to the present invention. The engine speed and engine load signals are sent to a set-point table 605 after they pass through a first low-pass filter 610 and a second low-pas filter 615 respectively. The set-point table 605 determines the desired exhaust back pressure (DEBP) based on the engine speed and engine load. The DEBP is then sent to summer 620. Notably, the DEBP of FIG. 6 is a special case, or the base case, of the various cases shown in FIG. 10. Thus, in the base case, the DEBP of FIG. 6 is the base desired exhaust back pressure of FIG. 10, and the set point table 605 of FIG. 6 is the base set-point table 605 of FIG. 10.

Other pre-determined engine parameters may be used to determine the DEBP in place of or in addition to the engine speed and load, e.g., as will be discussed with respect to FIG. 10. If other or additional engine operating parameters are used, the operating data identifies the desired exhaust back pressure based on those parameters.

Continuing with FIG. 6, the measured exhaust back pressure (MEBP) then passes through a low-pass filter 625 and is sent to the summer 620. The summer 620 determines the difference (ΔEBP) between the MEBP and the DEBP. The summer sends the ΔEBP to the pulse width modulated (PWM) driver 630.

Based on the ΔEBP, the PWM driver 630 determines and provides the duty cycle to the turbocharger 110. The duty cycle opens or closes the nozzles on the turbocharger as appropriate in response to the ΔEBP.

In a first approach, the PWM driver 630 opens and closes the nozzles incrementally in relation to the current position of the nozzles. For example, the duty cycle opens the nozzles an additional three degrees based on the ΔEBP. The incremental amount for opening or closing the nozzles may be fixed or may vary in relation to the magnitude of the ΔEBP.

In second approach, the PWM driver 630 opens and closes the nozzles to a specific pre-determined position regardless of their location. For example, the duty cycle moves the nozzles so they are open 15 degrees based on the ΔEBP.

Each approach achieves the desired result, positioning the nozzles to achieve th DEBP. However, the first approach is better suited for when incremental adjustments to the nozzle position are necessary to achieve the DEBP. Conversely, the second approach is better suited when major adjustments to the nozzle position are necessary to achieve the DEBP.

A third approach combines the first and second approaches. If the magnitude of EBP is large or exceeds a threshold, the duty cycle will move the nozzles to achieve the DEBP regardless of the current position of the nozzle. If the magnitude of EBP is small or below a threshold, the duty cycle will move the nozzles incrementally depending on the current position of the nozzles.

The control strategy continuously repeats itself unless other parameters are provided to disengage the control system. these other parameters include a turbocharger engagement/disengagementswitch, engine idle control strategy is on the order of 125 Hz. However the execution may be slower or faster especially when the variability of engine conditions change. For example, slower execution rates may be more suitable when the engine conditions do not change rapidly.

Figure 7:
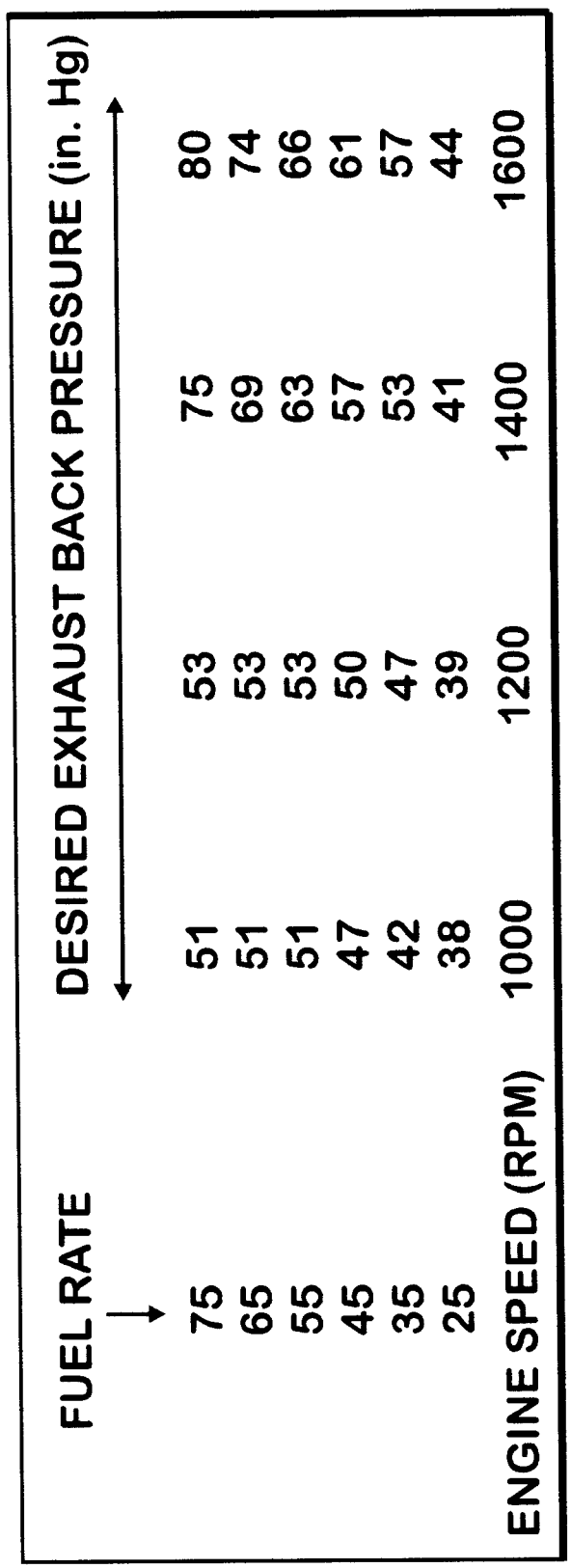
FIG. 7 is a set-point table for determining the desired exhaust back pressure according to the present invention.

FIG. 7 shows an abbreviated set point table 605 for determining a DEBP fir a particular engine load and speed. For example. the table indicates a DEBP of 63 in. Hg when the fuel rate is 55 and the engine speed is 1400 RPM. In use, the table is expanded to include a full range of DEBP values for all operating engine speeds and engine loads.

Turbocharger design and size changes the relationship between the duty cycle and nozzle position, For example, the duty cycle on one design opens the nozzles 10 degrees. The same duty cycle on another design opens the nozzles 12 degrees. turbochargers of the same design but different sizes show the same inconsistency.

In contrast, turbochargers of the same design and size have a consistent relationship between the duty cycle and nozzle opening, However, they have a manufacturing variability from one turbocharger to the next. this manufacturing bariability may be reduced substantially, and maybe statistically eliminated, through empirical analysis of the turbocharger throughout its operating range.

Empirical testing of the turbocharger determines the DEBP for given engine operating parameters (e.g., engine load and speed). The testing determines the DEBP or range of DEBP for maximizing the intake air boost while avoiding excessive exhaust pressure and overdriving conditions. Proper statistical analysis virtually eliminates any manufacturing variability between turbochargers of the same design and size.

Figure 8:
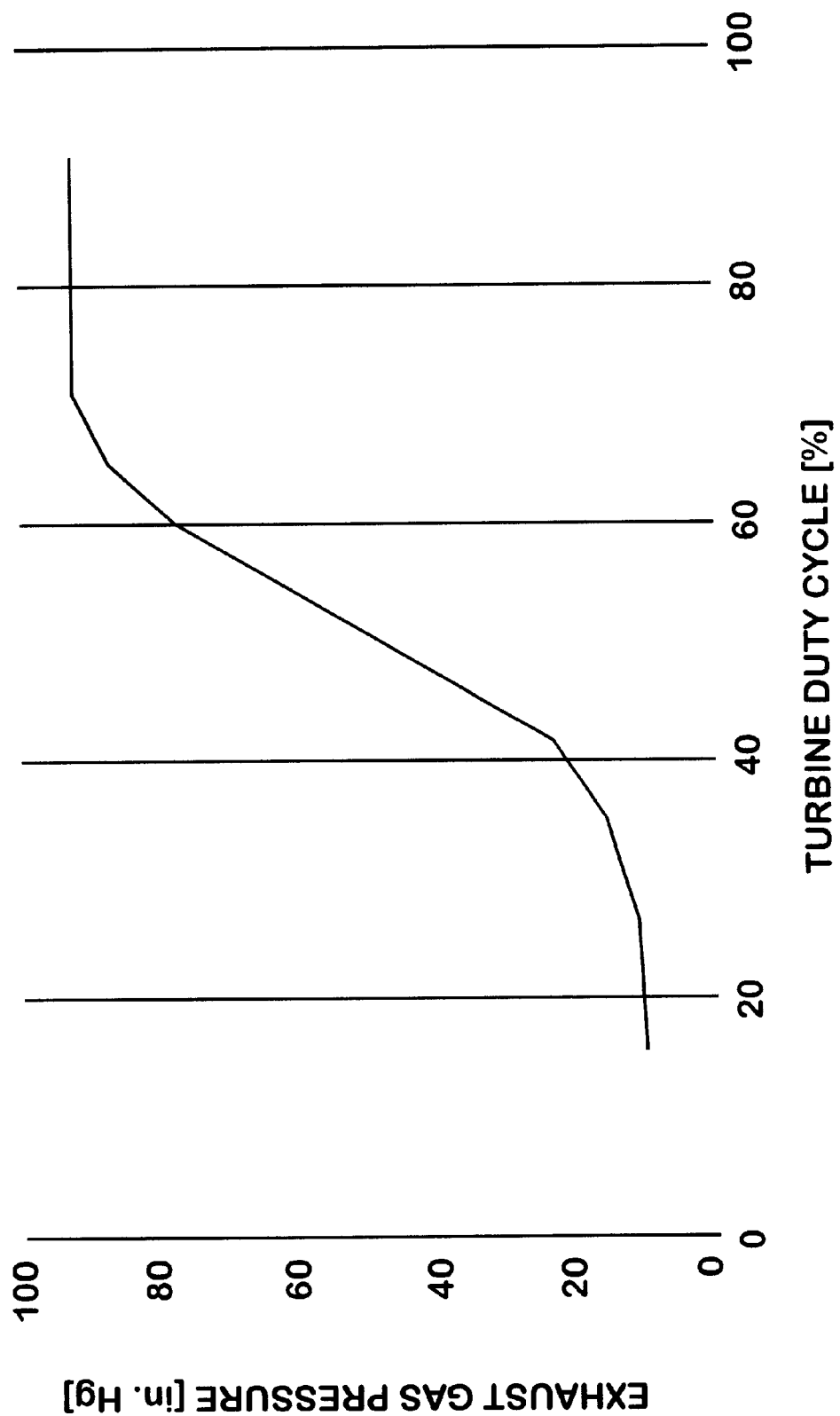
FIG. 8 is a chart comparing the exhaust gas pressure to the turbine duty cycle for a VNT turbocharger.

The present invention advantageously senses the exhaust back pressure to control a variable geometry turbocharger. As shown in FIG. 8. there is a direct relationship between the exhaust manifold pressure and the turbine duty cycle (nozzle position). By sensing the exhaust back pressure, the nozzles may be repositioned more optimally based on the desired exhaust back pressure.

In FIG. 8, the nozzles are fully open at a turbine duty cycle below 25 percent. The nozzles are fully closed at a turbine duty cycle above 75 percent. While the profile and location of the curve changes with the volume of exhaust gases, the relationship holds throughout the engine's different operating levels.

Figure 9:
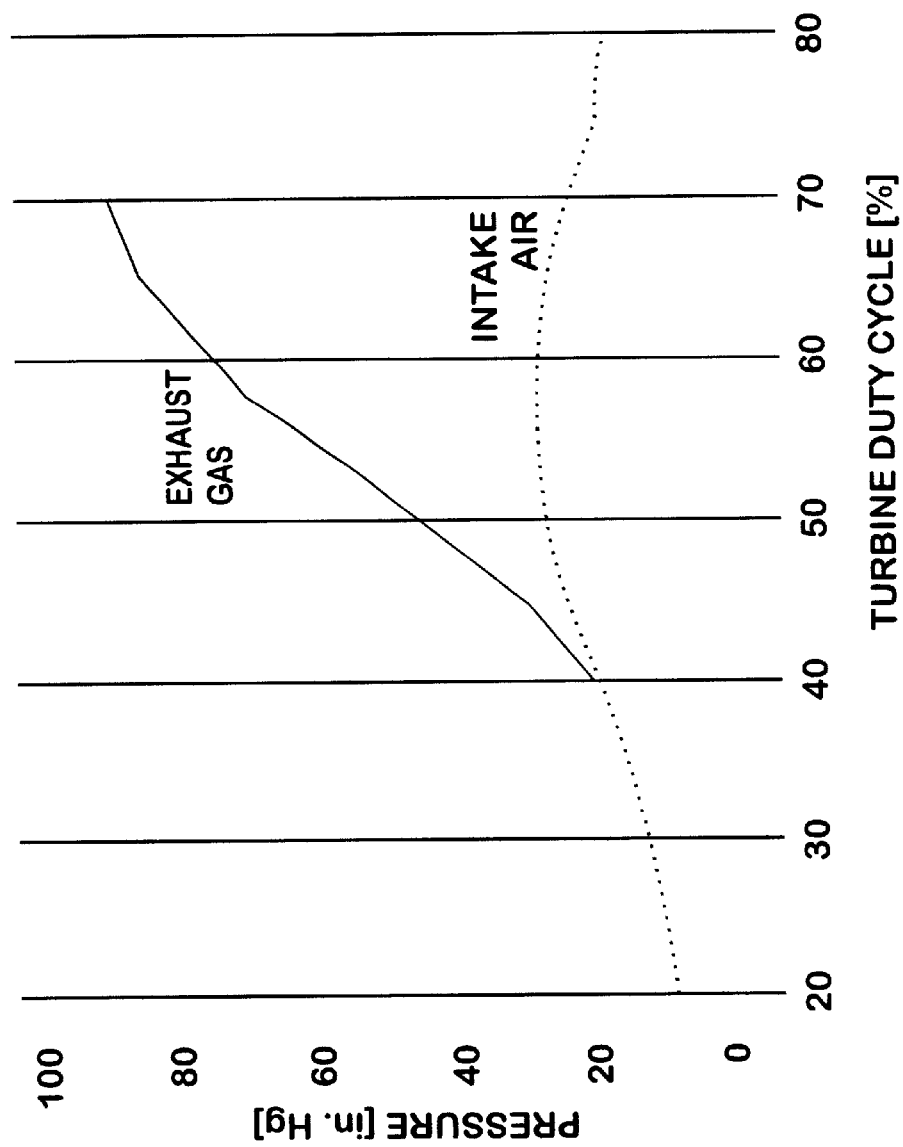
FIG. 9 is a chart comparing the intake air pressure and exhaust gas pressure to the turbine duty cycle for a VNT turbocharger.

Of importance are the dramatic changes in the exhaust gas pressure for relatively small changes in the turbine duty cycle. These dramatic changes enhance the control capabilities of the present invention. Ideally, it is desired to operate the turbocharger at or as close to an optimal operating position—the highest intake boost pressure without reaching excessive exhaust pressure or overdriving conditions. In practice, it is very difficult to consistently achieve or even come close to this optimal operating position. the operating and manufacturing variability of the turbocharger as well as changing engine conditions compound problem In addition, the intake air pressure does not change dramatically as the duty cycle changes. Because of these difficulties, many controllers based on intake air pressure incorporate large margins of error to avoid excessive exhaust gas pressure and overdriving conditions. In contrast, the dramatic changes in the exhaust gas pressure to changes in the duty cycle enable the present invention to operate closer or at the optimal operating position. FIG. 9 shows compares the exhaust gas and intake air pressures with the turbine duty cycle.

This better control enables a plurality of alternate embodiments of the present invention. These alternate embodiments involve adjusting the desired exhaust back pressure (DEBP) to provide additional features such as cold weather warm-up of the engine, engine braking, and exhaust gas recirculation (EGR). Similar features may be added but are not shown. These additional features include overspeed protection for the turbine, ambient pressure adjustments, and the like.

Figure 10:
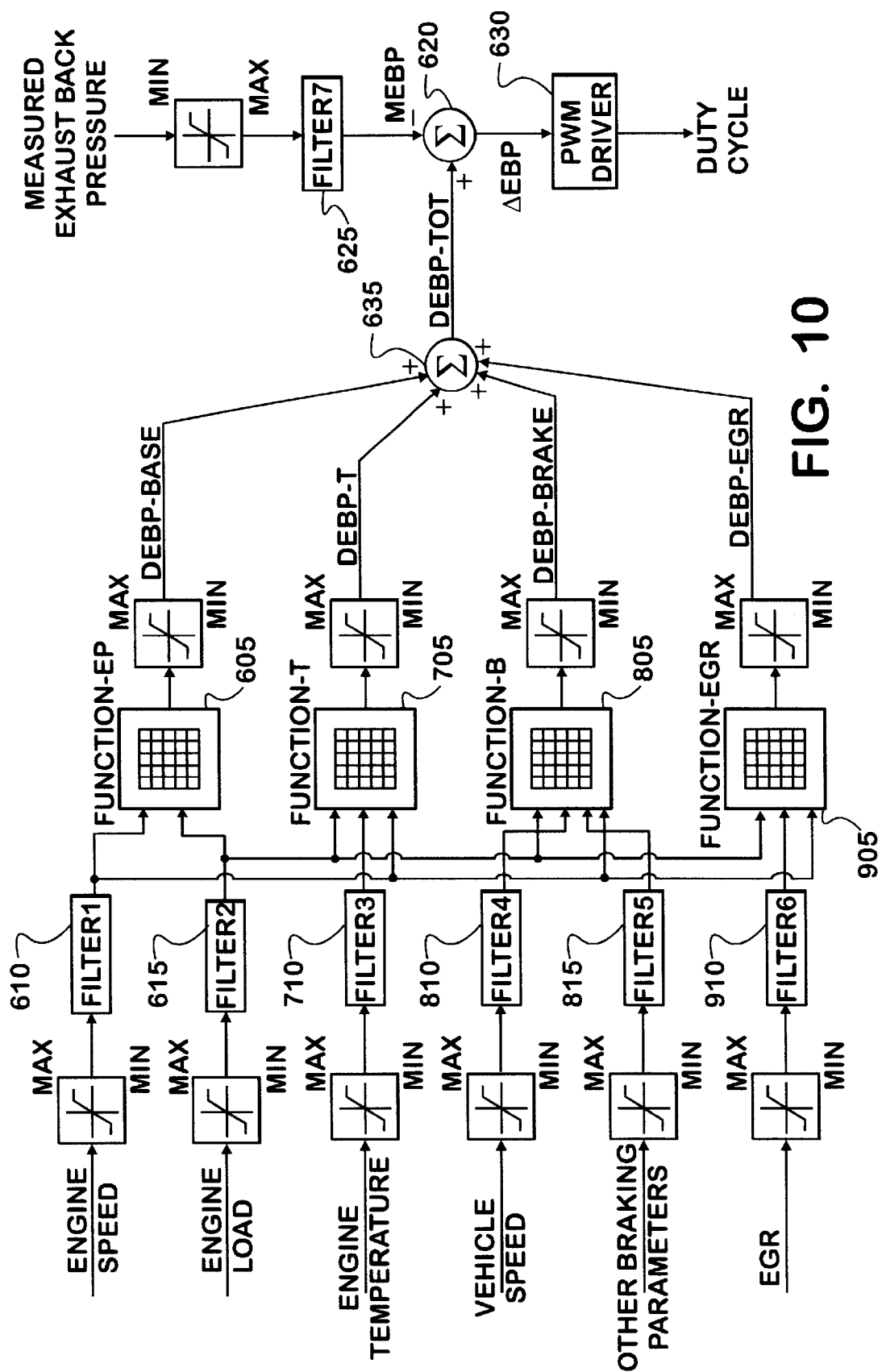
FIG. 10 is a block diagram showing a second embodiment of the closed-loop control strategy for a turbocharger according to the present invention.

FIG. 10 shows a second embodiment of a closed-loop control strategy for a turbocharger according to the present invention. The engine speed and engine load signals are sent to a set-point tables 605, 705, 805, 905 after they pass through a first and second low-pass filters 610, 615 respectively. The base set-point table 605 determines the base desired exhaust back pressure (DEBP-BASE) based on the engine speed and engine load. The DEBP-BASE is sent to a DEBP summer 635.

To provide cold weather warm-up, an engine temperature signal is sent to temperature set-point table 705 after it passes through a third low-pass filter 710. The engine temperature signal may be provided through a sensor in the engine oil, the engine coolant, or other similar means. The temperature set-point table 705 determines the temperature desired exhaust back pressure (DEBP-T) based on the engine speed, load, and temperature. When the engine is cold and idling, the DEBP-T increases to hasten engine warm-up. When the engine is running at higher speeds or the engine load is high, the DEBP-T is low or zero because there is little need to increase the exhaust back pressure under these conditions. The DEBP-T is sent to the DEBP summer 635.

When engine braking is desired, signals for the vehicle speed and other braking parameters are sent to a braking set-point tables 805 after they pass through a fourth low-pass filter 810 and a fifth low-pass filter 815. Other braking parameters can include ABS brakes, cruise control settings, emergency brake activation, and other similar signals or related parameters. The braking set-point table 805 determines the braking desired exhaust back pressure (DEBP-BRAKE) based on the engine speed, engine load, vehicle speed, and other parameters. The DEBP-BRAKE is sent to the DEBP summer 635.

When exhaust gas recirculation (EGR) is desired, an EGR signal is sent to an EGR set-point tables 905 after it passes through a sixth low-pass filter 910. The EGR set-point table 905 determines the EGR desired exhaust back pressure (DEBP-EGR) based on the engine speed and engine load. The DEBP-EGR is sent to the DEBP summer 635. While this feature may be used to control the amount of EGR to the engine, its purpose is to ensure the exhaust gas pressure is higher than the intake boost pressure. This avoids costly venturi and similar devices to ensure the exhaust gas has sufficient pressure to enter the intake air manifold.

At the DEBP summer 635, the DEBP-BASE, the DEBP-T, the DEBP-BRAKE, and the DEBP-EGR are combined to yield the total desired exhaust back pressure (DEBP-TOT). The DEBP-TOT is sent to summer 620.

The measured exhaust back pressure (MEBP) passes through a seventh low-pass filter 625 and is sent to the summer 620. The summer 620 determines the difference ($\Delta$EBP) between the MEBP and the DEBP-TOT. The summer 620 sends the $\Delta$EBP to the pulse width modulated (PWM) driver 630.

Based on the $\Delta$EBP, the PWM driver 630 determines and provides the duty cycle to the turbocharger 110. The duty cycle opens or closes the nozzles on the turbocharger as appropriate in response to the $\Delta$EBP.

As previously described, the PWM driver 630 opens and closes the nozzles incrementally in relation to the current position of the nozzles. Alternatively, the PWM driver 630 opens and closes the nozzles to a specific position regardless of their location. These approaches may be combined.

The control strategy continuously repeats itself unless other parameters are provided to disengage the control system. The preferred execution rate of the control strategy is on the order of 125 Hz. However, the execution may be slower or faster especially when the variability of engine conditions change.

While the cold weather warm-up, the engine braking, and EGR have been described in a single embodiment, they maybe used separately or in any combination. Other features also may be similarly incorporated into any of the embodiments. These features include overspeed protection for the turbine, ambient pressure adjustments, and the like. The ambient air pressure may be measured so the turbocharger can be adjusted for various altitude conditions. In addition, the operating parameters (e.g., engine speed, engine load, and others) may be used singly, all together, or in any combination to control the turbocharger 110.

Figure 11:
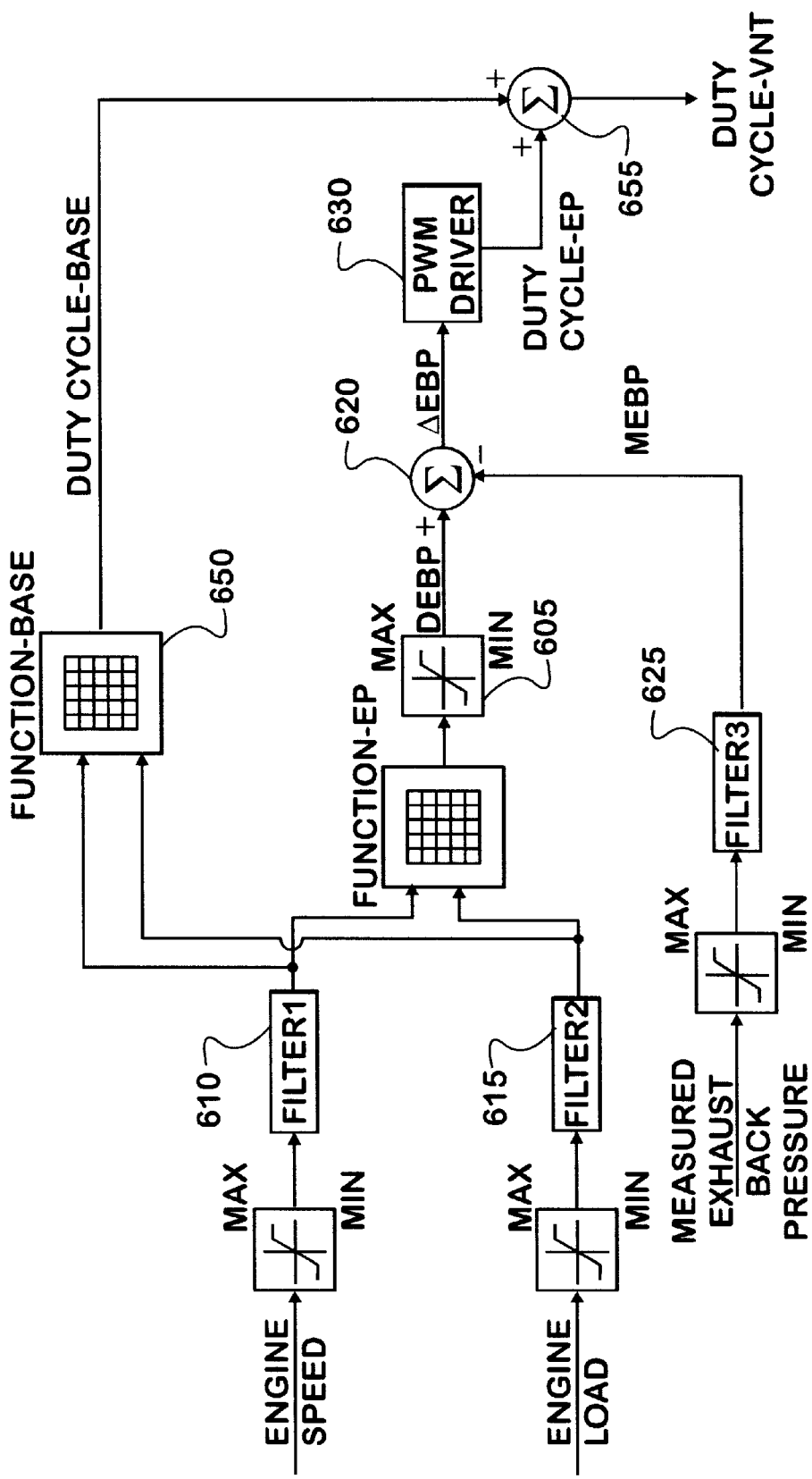
FIG. 11 is a block diagram showing a third embodiment of the closed-loop control strategy for a turbocharger according to the present invention.

FIG. 11 shows a third embodiment of the closed-loop control strategy for a turbocharger according to the present invention. In this embodiment, the exhaust gas pressure is used to adjust the duty cycle set by some other predetermined engine parameter(s). In contrast, the previous embodiments set the duty cycle based on the exhaust gas pressure. The engine speed and engine load signals are sent to a set-point tables 605, and a base duty cycle set-point table 650 after they pass through a first low-pass filter 610 and a second low-pass filter 615 respectively. The set-point table 605 determines the desired exhaust back pressure (DEBP) based on the engine speed and engine load. The DEBP is sent to summer 620.

The measured exhaust back pressure (MEBP) passes through a low-pass filter 625 and is sent to the summer 620. The summer 620 determines the difference ($\Delta$EBP) between the MEBP and the DEBP. The summer sends the $\Delta$EBP to the pulse width modulated (PWM) driver 630. Based on the $\Delta$EBP, the PWM driver 630 determines and provides an exhaust pressure duty cycle (DUTY CYCLE-EP) to summer 655.

A base set-point table 650 determines a base duty cycle (DUTY CYCLE-BASE) based on the engine speed and engine load. These parameters are shown as an example because the based duty cycle may be determined by other parameters. The DUTY CYCLE-BASE is sent to summer 655.

Summer 655 combines the DUTY CYCLE-EP and the DUTY CYCLE-BASE to determine and send the turbocharger duty cycle (DUTY CYCLE-VNT) to the turbocharger 110. DUTY CYCLE-VNT opens or closes nozzles on the turbocharger as appropriate. In this manner, the DUTY CYCLE-BASE is adjusted by the $\Delta$EBP.

The control strategy continuously repeats itself unless other parameters are provided to disengage the control system. The preferred execution rate of the control strategy is on the order of 125 Hz. However, the execution may be slower or faster especially when the variability of engine conditions change. Of course, the control strategy may also include the cold weather engine warm-up, engine braking, and EGR features described in the second embodiment. Thus, the operating parameters (e.g., engine speed, engine load, and others) can be used singly, all together, or in any combination to control the turbocharger 110 similarly to that described with respect to FIG. 10.

Figure 12:
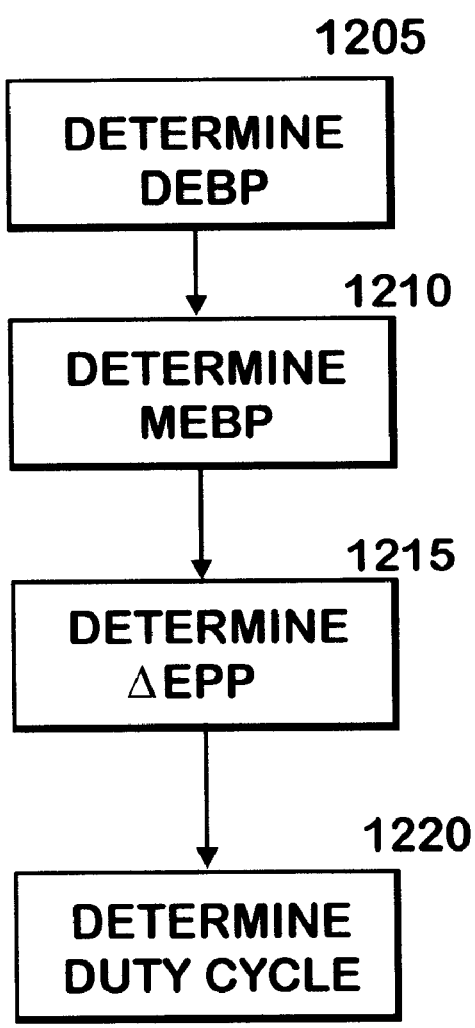
FIG. 12 is a method for controlling a VNT turbocharger according to the present invention.

FIG. 12 shows a method for controlling a variable nozzle turbocharger using the exhaust back:pressure according to the present invention. In step 1205, the desired exhaust back pressure (DEBP) is determined from the engine speed and engine load. Other engine or vehicle parameters may be used in addition to the engine speed and load. Prior empirical testing provides a map of DEBP's based on the full operating range of the engine speed and load. In operation, the map is used to determine the DEBP based on the speed and load. The DEBP may be adjusted to avoid over speeding the turbocharger and for changes in ambient air pressure.

In step 1210, the measured exhaust back pressure (MEBP) is determined from a sensor placed in the exhaust gas manifold. Other sensing devices may be used as well as other locations as long as an electrical or other signal is provided indicative of the exhaust gas pressure In step 1215, the difference ($\Delta$EBP) between the DEBP and the MEBP is determined. In step 1220, the duty cycle of the turbocharger is determined based on the $\Delta$EBP.

Figure 13:
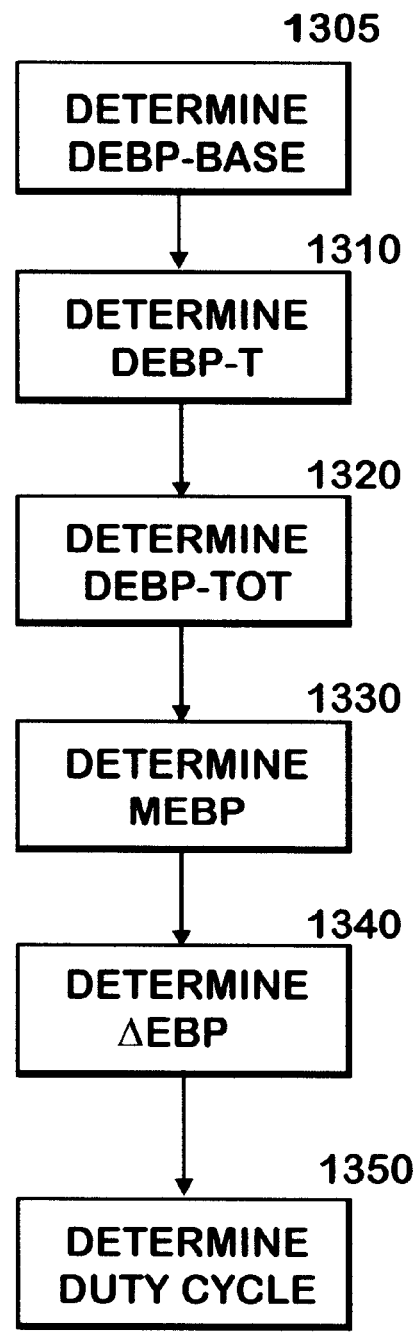
FIG. 13 is a method for controlling a VNT turbocharger with cold weather warm-up capabilities according to the present invention.

FIG. 13 shows a method for using the exhaust back pressure to control a variable nozzle turbocharger having cold weather warm-up capabilities according to the present invention. In step 1305, the base desired exhaust back pressure (DEBP-BASE) is determined from the engine speed and engine load. Other engine or vehicle parameters may be used in place of or in addition to the engine speed and load.

In step 1310, the temperature desired exhaust back pressure (DEBP-T) is determined from the engine temperature, the engine speed, and the engine load. The engine temperature may be provided by a sensor in the engine oil, a sensor in the coolant, or other suitable means for determining the engine temperature. When the engine speed or the engine load is high, the DEBP-T is little or none.

In step 1320, the total desired exhaust back pressure (DEBP-TOT) is determined. The DEBP-BASE is adjusted by the DEBP-T to provide the DEBP-TOT. In step 1330, the measured exhaust back pressure (MEBP) is determined usually from a sensor placed in the exhaust gas manifold. In step 1340, the difference ($\Delta$EBP) between the DEBP-TOT and the MEBP is determined. In step 1350, the duty cycle of the turbocharger is determined.

Figure 14:
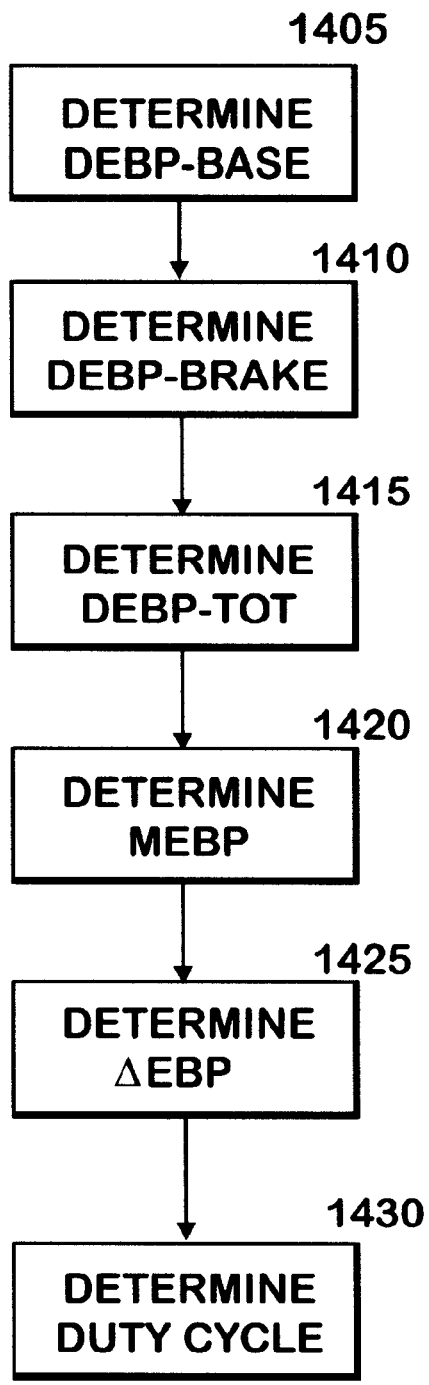
FIG. 14 is a method for controlling a VNT turbocharger with engine braking capabilities according to the present invention.

FIG. 14 shows a method for using the exhaust back pressure to control a variable nozzle turbocharger having engine braking capabilities according to the present invention. In step 1405, the base desired exhaust back pressure (DEBP-BASE) is determined from the engine speed and engine load. Other engine or vehicle parameters may be used in addition to the engine speed and load.

In step 1410, the braking desired exhaust back pressure (DEBP-BRAKE) is determined from the engine speed, engine load, vehicle speed, and other pre-determined braking-related engine parameters. These other engine parameters include ABS brake operation, emergency brake activation, cruise control activation, and the like.

In step 1415, the total desired exhaust back pressure (DEBP-TOT) is determined. The DEBP-BASE is adjusted by the DEBP-BRAKE to provide the DEBP-TOT.

In step 1420, the measured exhaust back pressure (MEBP) is determined usually from a sensor placed in the exhaust gas manifold. In step 1425, the difference ($\Delta$EBP) between the DEBP-TOT and the MEBP is determined. In step 1430, the duty cycle of the turbocharger is determined.

Figure 15:
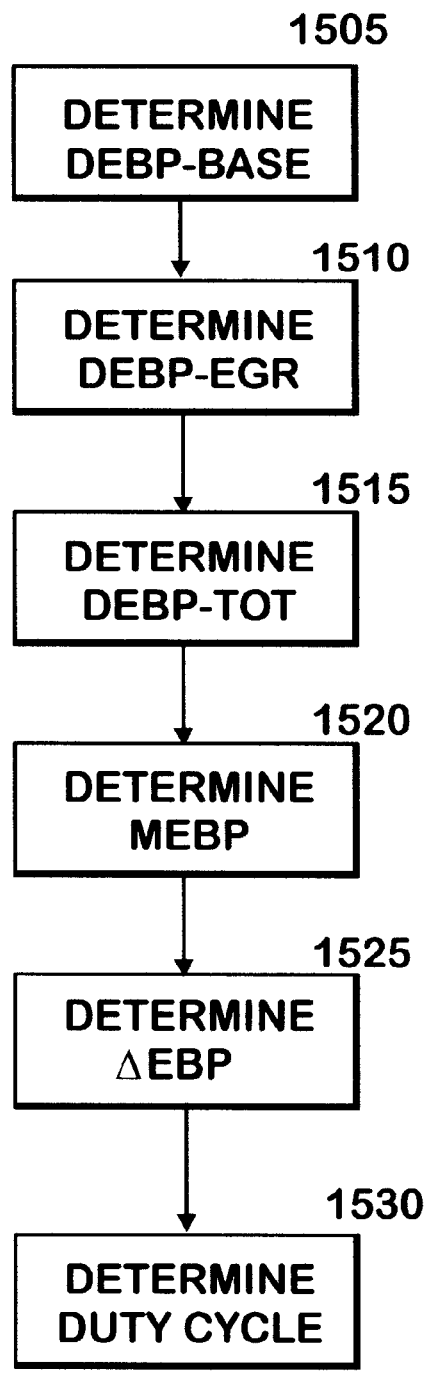
FIG. 15 is a method for controlling a VNT turbocharger with exhaust gas recirculation capabilities according to the present invention.

FIG. 15 shows a method for using the exhaust back pressure to control a variable nozzle turbocharger having exhaust gas recirculation (EGR) capabilities according to the present invention. In step 1505, the base desired exhaust back pressure (DEBP-BASE) is determined from the engine speed and engine load. Other engine or vehicle parameters may be used in place of or in addition to the engine speed and load.

In step 1510, the EGR desired exhaust back pressure (DEBP-EGR) is determined from the engine temperature, the engine speed, and EGR requirements. While the present invention may be used to control EGR, it is used to ensure the exhaust pressure is higher than the intake air pressure. The EGR requirements are provided by an EGR controller or similar device.

In step 1515, the total desired exhaust back pressure (DEBP-TOT) is determined. DEBP-BASE is adjusted by the DEBP-EGR to provide the DEBP-TOT.

In step 1520, the measured exhaust back pressure (MEBP) is determined usually from a sensor placed in the exhaust gas manifold. In step 1525, the difference ($\Delta$EBP) between the DEBP-TOT and the MEBP is determined. In step 1530, the duty cycle of the turbocharger is determined.

It will be readily understood by those of skill in the art that the methods described in FIGS. 12–15 may be combined into a method for using the exhaust back pressure to control a turbocharger having cold weather warm-up of the engine, engine braking, and EGR capabilities.

Figure 16:
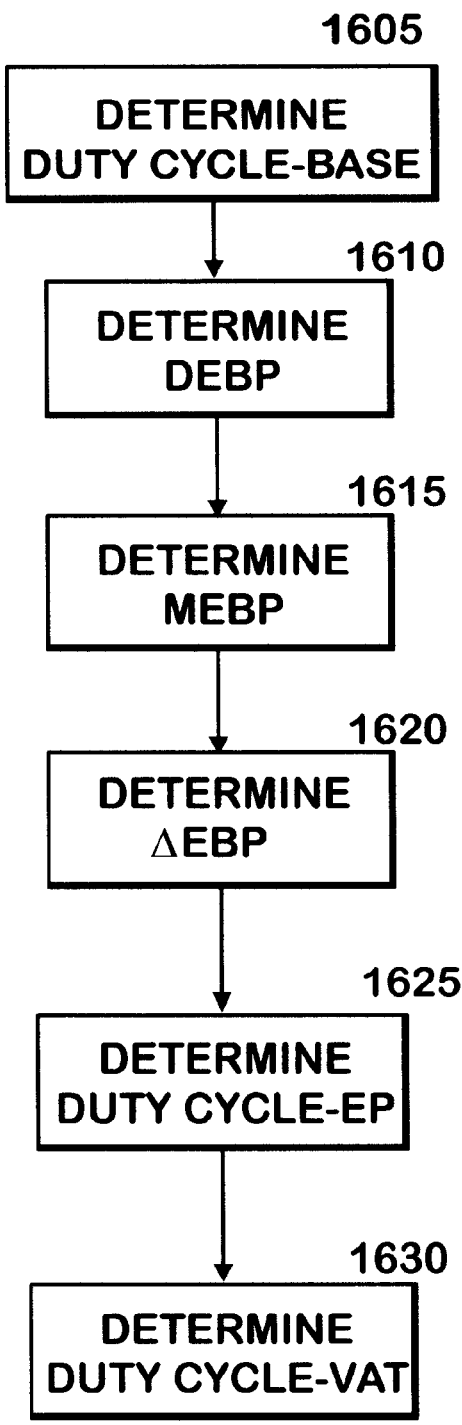
FIG. 16 is an alternate method for controlling a VNT turbocharger according to the present invention.

FIG. 16 shows an alternate method for controlling a variable nozzle turbocharger using the exhaust gas pressure according to the present invention. In step 1605, the base duty cycle (DUTY CYCLE-BASE) is determined from the engine speed and engine load. Other engine or vehicle parameters may be used in addition to the engine speed and load.

In step 1610, the desired exhaust back pressure (DEBP) is determined from the engine speed and engine load. Other engine or vehicle parameters may be used in place of or in addition to the engine speed and load.

In step 1615, the measured exhaust back pressure (MEBP) is determined usually from a sensor placed in the exhaust gas manifold. In step 1620, the difference (ΔEBP) between the DEBP and the MEBP is determined. In step 1625, the exhaust pressure duty cycle (DUTY CYCLE-EP) is determined based on the ΔEBP. In step 1630, the DUTY CYCLE-BASE is adjusted by the DUTY CYCLE-EP to provide the turbocharger duty cycle (DUTY CYCLE-VNT).

The invention has been described and illustrated with respect to certain preferred embodiments by way of example only. Additional advantages will readily occur to those skilled in the art, who may make changes without departing from the true spirit and scope of the invention. For example, the control system of the present invention may be applied to a turbocharger with a variable nozzle compressor and with or without a variable nozzle turbine. The control system may be used on multiple turbochargers. In addition, the control logic in the system may be replaced by electronic circuits which perform the same function as the control logic. Therefore, the invention is not limited to the specific details, representative devices, and illustrated examples in this description. Accordingly, the present invention is limited only by the following claims and equivalents.

We claim:

1. A method for controlling a variable geometry turbocharger used in an internal combustion engine, the method comprising the steps of:

sensing at least one engine parameter;

inputting the engine parameter signals to a controller;

determining a total desired exhaust back pressure based on the inputted engine parameters;

determining a measured exhaust back pressure;

determining a difference exhaust back pressure between the total desired exhaust back pressure and the measured exhaust back pressure;

determining a duty cycle based upon the difference exhaust back pressure; and actuating turbocharger nozzles based upon the calculated duty cycle to thereby achieve the total desired exhaust back pressure.

2. The method of claim 1, wherein the nozzles operate incrementally in relation to nozzle positions existing prior to actuation.

3. The method of claim 1, wherein the nozzles assume predetermined nozzle positions irrespective of nozzle position existing prior to actuation.

4. The method of claim 1, wherein the total desired exhaust back pressure is a base desired exhaust back pressure, a temperature desired exhaust back pressure, braking desired exhaust back pressure, or an exhaust gas recirculation desired exhaust back pressure.

5. The method of claim 1, wherein the total desired exhaust back pressure is any combination of a base desired exhaust back pressure, a temperature desired exhaust back pressure, braking desired exhaust back pressure, and an exhaust gas recirculation desired exhaust back pressure.

6. The method of claim 1, wherein the total desired exhaust back pressure comprises:

the base desired exhaust back pressure;

the temperature desired exhaust back pressure;

the braking desired exhaust back pressure; and the exhaust gas recirculation desired exhaust back pressure.

7. The method of claim 1, wherein the difference exhaust back pressure is calculated in a controller.

8. The method of claim 1, wherein a controller generates a pulse width modulated signal to a pulse width modulated driver which will determine the duty cycle.

9. The method of claim 8, wherein the pulse width modulated driver provides the duty cycle to a control device for the nozzles.

10. The method of claim 1, wherein the nozzles are fully open at a duty cycle at or below 25 percent, and fully closed at a duty cycle at or above 75 percent.

11. A method for controlling a variable geometry turbocharger used in an internal combustion engine, the method comprising the steps of:

sensing at least one engine parameter;

inputting the engine parameter signals to a controller;

determining a base duty cycle;

determining a total desired exhaust back pressure based on the inputted engine parameters;

determining a measured exhaust back pressure;

determining a difference exhaust back pressure between the total desired exhaust back pressure and the measured exhaust back pressure;

determining an exhaust pressure duty cycle based upon the difference exhaust back; pressure;

determining a turbocharger duty cycle by adjusting the base duty cycle by the exhaust pressure duty cycle; and actuating turbocharger nozzles based upon the turbocharger duty cycle.

12. The method of claim 11, wherein the nozzles operate incrementally in relation to nozzle positions existing prior to actuation.

13. The method of claim 11, wherein the nozzles assume predetermined nozzle positions irrespective of nozzle position existing prior to actuation.

14. The method of claim 11, wherein the base duty cycle is determined through a base duty cycle set-point table based on engine speed and engine load.

15. The method of claim 11, wherein the base duty cycle is determined through a base duty cycle set-point table based on engine temperature, engine speed and engine load.

16. The method of claim 11, wherein the base duty cycle is determined through a base duty cycle set-point table based on braking parameters, vehicle speed, engine speed and engine load.

17. The method of claim 11, wherein the base duty cycle is determined through a base duty cycle set-point table based on an exhaust gas recirculation signal, engine speed and engine load.

18. The method of claim 11, wherein the base duty cycle is determined through a base duty cycle set-point table based on engine temperature, braking parameters, vehicle speed, an exhaust gas recirculation signals engine speed and engine load.

19. The method of claim 14, wherein the total desired exhaust back pressure is a base desired exhaust back pressure, a temperature desired exhaust back pressure, braking desired exhaust back pressure, or an exhaust gas recirculation desired exhaust back pressure.

20. The method of claim 14, wherein the total desired exhaust back pressure is any combination of a base desired exhaust back pressure, a temperature desired exhaust back pressure, braking desired exhaust back pressure, and an exhaust gas recirculation desired exhaust back pressure.

21. The method of claim 14, wherein the total desired exhaust back pressure comprises:
the base desired exhaust back pressure;
the temperature desired exhaust back pressure;
the braking desired exhaust back pressure; and
the exhaust gas recirculation desired exhaust back pressure.

22. The method of claim 11, wherein the difference exhaust back pressure is calculated in a controller.

23. The method of claim 11, wherein a controller generates a pulse width modulated signal to a pulse width modulated driver which will determine the duty cycle.

24. The method of claim 23, wherein the pulse width modulated driver provides the duty cycle to a control device for the nozzles.

25. The method of claim 11, wherein the nozzles are fully open at a duty cycle at or below 25 percent, and fully closed at a duty cycle at or above 75 percent.

26. A control system for a variable geometry turbocharger for use in an internal combustion engine, the control system comprising:
at least one engine sensor able to generate a corresponding engine parameter measurement signal;
an exhaust back pressure sensor able to generate an exhaust back pressure measurement signal;
a control device able to actuate a turbocharger nozzle; and
a controller able to receive and process, the exhaust back pressure measurement signal and the at least one engine parameter measurement signal to thereby generate a control signal to the control device, based upon the exhaust back pressure measurement signal and at least one predetermined engine parameter signal, to thereby actuate the turbocharger nozzle.

27. The control system of claim 26, wherein the at least one predetermined engine parameter is vehicle speed, engine speed, engine load, engine temperature, or ambient air temperature.

28. The control system of claim 26, wherein the controller is an electronic control module, an engine microprocessor, or a turbocharger microprocessor.

29. The control system of claim 26, wherein the measurement signal is electronic, magnetic or optical.

30. A method for controlling a variable geometry turbocharger, having an operatively connected turbine and compressor housings, used in an internal combustion engine, the method comprising the steps of:
determining a total desired exhaust back pressure;
determining a measured exhaust back pressure;
determining a difference exhaust back pressure between the total desired exhaust back pressure and the measured exhaust back pressure;
determining a duty cycle based upon the difference exhaust back pressure; and
actuating turbocharger nozzles based upon the calculated duty cycle;
whereby the nozzles are positioned to achieve the total desired exhaust back pressure and where the nozzles operate incrementally in relation to nozzle positions existing prior to actuation.

31. A method for controlling a variable geometry turbocharger, having an operatively connected turbine and compressor housings, used in an internal combustion engine, the method comprising the steps of:
determining a total desired exhaust back pressure;
determining a measured exhaust back pressure;
determining a difference exhaust back pressure between the total desired exhaust back pressure and the measured exhaust back pressure;
determining a duty cycle based upon the difference exhaust back pressure; and
actuating turbocharger nozzles based upon the calculated duty cycle;
whereby the nozzles am positioned to achieve the total desired exhaust back pressure and where the nozzles assume predetermined nozzle positions irrespective of nozzle position existing prior to actuation.

32. A method for controlling a variable geometry turbocharger, having an operatively connected turbine and compressor housings, used in an internal combustion engine, the method comprising the steps of:
determining a total desired exhaust back pressure;
determining a measured exhaust back pressure;
determining a difference exhaust back pressure between the total desired exhaust back pressure and the measured exhaust pressure;
determining a duty cycle based upon the difference exhaust back pressure; and
actuating turbocharger nozzles based upon the calculated duty cycle;
whereby the nozzles are positioned to achieve the total desired exhaust back pressure and where the total desired exhaust back pressure is a base desired exhaust back pressure, a temperature desired exhaust back pressure, braking desired exhaust back pressure, or an exhaust gas recirculation desired exhaust back pressure.

33. A method for controlling a variable geometry turbocharger, having an operatively connected turbine and compressor housings, used in an internal combustion engine, the method comprising the steps of:
determining a total desired exhaust back pressure;
determining a measured exhaust back pressure;
determining a difference exhaust back pressure between the total desired exhaust back pressure and the measured exhaust back pressure;
determining a duty cycle based upon the difference exhaust back pressure; and
actuating turbocharger nozzles based upon the calculated duty cycle;
whereby the nozzles are positioned to achieve the total desired exhaust back pressure, wherein the total desired exhaust back pressure comprises the base desired exhaust back pressure, the temperature desired exhaust back pressure, the braking desired exhaust back pressure, and the exhaust gas recirculation desired exhaust back pressure.

34. A method for controlling a variable geometry turbocharger, having an operatively connected turbine and compressor housing used in an internal combustion engine, the method comprising the steps of:
determining a total desired exhaust back pressure;
determining a measured exhaust back pressure;
determining a difference exhaust back pressure between the total desired exhaust back pressure and the measured exhaust back pressure;
determining a duty cycle based upon the difference exhaust back pressure; and actuating turbocharger nozzles based upon the calculated duty cycle;

whereby the nozzles are positioned to achieve the total desired exhaust back pressure and wherein the nozzles are filly open at a duty cycle at or below 25 percent, and fully closed at a duty cycle at or above 75 percent.

35. A method for controlling a variable geometry turbocharger, having operatively connected turbine and compressor housings, used in an internal combustion engine, the method comprising the steps of:

determining a base duty cycle;

determining a total desired exhaust back pressure;

determining a measured exhaust back pressure;

determining a difference exhaust back pressure between the total desired exhaust back pressure and the measured exhaust back pressure;

determining an exhaust pressure duty cycle based upon the difference exhaust back pressure;

determining a turbocharger duty cycle by adjusting the base duty cycle by the exhaust pressure duty cycle; and actuating turbocharger nozzles based upon the turbocharger duty cycle;

wherein the nozzles operate incrementally in relation to nozzle positions existing prior to actuation.

36. A method for controlling a variable geometry turbocharger, having operatively connected turbine and compressor housings, used in an internal combustion engine, the method comprising the steps of:

determining a base duty cycle;

determining a total desired exhaust back pressure;

determining a measured exhaust back pressure;

determining a difference exhaust back pressure between the total desired exhaust back pressure and the measured exhaust back pressure;

determining an exhaust pressure duty cycle based upon the difference exhaust back pressure;

determining a turbocharger duty cycle by adjusting the base duty cycle by the exhaust pressure duty cycle; and actuating turbocharger nozzles based upon the turbocharger duty cycle;

wherein the nozzles assume predetermined nozzle positions irrespective of nozzle position existing prior to actuation.

37. A method for controlling a variable geometry turbochager, having operatively connected turbine and compressor housings, used in an internal combustion engine, the method comprising the steps of;

determining a base duty cycle;

determining a total desired exhaust back pressure;

determining a measured exhaust back pressure;

determining a difference exhaust back pressure between the total desired exhaust back pressure and the measured exhaust back pressure;

determining an exhaust pressure duty cycle based upon the difference exhaust back pressure;

determining a turbocharger duty cycle by adjusting the base duty cycle by the exhaust pressure duty cycle; and actuating turbocharger nozzles based upon the turbocharger duty cycle;

wherein the base duty cycle is determining through a base duty cycle set-point table based on engine speed and engine load.

38. A method for controlling a variable geometry turbocharger, having operatively connected turbine and compressor housings, used in an internal combustion engine, the method comprising the steps of:

determining a base duty cycle;

determining a total desired exhaust back pressure;

determining a measured exhaust back pressure;

determining a difference exhaust back pressure between the total desired exhaust back pressure and the measured exhaust back pressure;

determining an exhaust pressure duty cycle based upon the difference exhaust back pressure;

determining a turbocharger duty cycle by adjusting the base duty cycle by the exhaust pressure duty cycle; and actuating turbocharger nozzles based upon the turbocharger duty cycle;

wherein he base duty cycle is determining through a base duty cycle set-point table based on engine temperate, engine speed and engine load.

39. A method for controlling a variable geometry turbocharger, having operatively connected turbine and compressor housings, used in an internal combustion engine, the method comprising the steps of:

determining a base duty cycle;

determining a total desired exhaust back pressure;

determining a measured exhaust back pressure;

determining a difference exhaust back pressure between the total desired exhaust back pressure and the measured exhaust back pressure;

determining an exhaust pressure duty cycle based upon the difference exhaust back pressure;

determining a turbocharger duty cycle by adjusting the base duty cycle by the exhaust pressure duty cycle; and actuating turbocharger nozzles based upon the turbocharger duty cycle;

wherein the base duty cycle is determined through a base duty cycle set-point table based on braking parameters, vehicle speed, engine speed and engine load.

40. A method for controlling a variable geometry turbocharger, having operatively connected turbine and compressor housings, used in an internal combustion engine, the method comprising the steps of:

determining a base duty cycle;

determining a total desired exhaust back pressure;

determining a measured exhaust back pressure;

determining a difference exhaust back pressure between the total desired exhaust back pressure and the measured exhaust back pressure;

determining an exhaust pressure duty cycle based upon the difference exhaust back pressure;

determining a turbocharger duty cycle by adjusting the base duty cycle by the exhaust pressure duty cycle; and actuating turbocharger nozzles based upon the turbocharger duty cycle;

wherein the base duty cycle is determined through a base duty cycle set-point table based on an exhaust gas recirculation signal, engine speed and engine load.

41. A method for controlling a variable geometry turbocharger, having operatively connected turbine and compressor housings, used in an internal combustion engine, the method comprising the steps of:

determining a base duty cycle;

determining a total desired exhaust back pressure;

determining a measured exhaust back pressure;

determining a difference exhaust back pressure between the total desired exhaust back pressure and the measured exhaust back pressure;

determining an exhaust pressure duty cycle based upon the difference exhaust back pressure, determining a turbocharger duty cycle by adjusting the base duty cycle by the exhaust pressure duty cycle; and actuating turbocharger nozzles based upon the turbocharger duty cycle;

wherein the base duty cycle is determined through a base duty cycle set-point table based on engine temperature, braking parameters, vehicle speed, an exhaust gas recirculation signal, engine speed and engine load.

42. The method of claim 37, wherein the total desired exhaust back pressure is a base desired exhaust back pressure, a temperature desired exhaust back pressure, braking desired exhaust back pressure, or an exhaust gas recirculation desired exhaust back pressure.

43. The method of claim 37, wherein the total desired exhaust back pressure is any combination of a base desired exhaust back pressure, a temperature desired exhaust back pressure, braking desired exhaust back pressure, and an exhaust gas recirculation desired exhaust back pressure.

44. The method of claim 37, wherein the total desired exhaust back pressure comprises:

the base desired exhaust back pressure;

the temperature desired exhaust back pressure;

the braking desired exhaust back pressure; and the exhaust gas recirculation desired exhaust back pressure.

45. A method for controlling a variable geometry turbocharger, having operatively connected turbine and compressor housings, used in an internal combustion engine, the method comprising the steps of:

determining a base duty cycle;

determining a total desired exhaust back pressure;

determining a measured exhaust back pressure;

determining a difference exhaust back pressure between the total desired exhaust back pressure and the measured exhaust back pressure;

determining an exhaust pressure duty cycle based upon the difference exhaust back pressure,;

determining a turbocharger duty cycle by adjusting the base duty cycle by the exhaust pressure duty cycle; and actuating turbocharger nozzles based upon the turbocharger duty cycle;

wherein the nozzles are fully open at a duty cycle at or below 25 percent, and filly closed at a duty cycle at or above 75 percent.

46. A control system for a variable geometry turbocharger, having operatively connected turbine and compressor housings, for use in an internal combustion engine, the control system comprising:

an exhaust back pressure sensor able to generate an exhaust back pressure measurement signal;

a control device able to actuate a turbocharger nozzle; and a controller able to process the exhaust back pressure measurement signal and generate a control signal to the control device, based upon the exhaust back pressure measurement signal and at least one predetermined engine parameter, to thereby actuate the turbocharger nozzle;

wherein the at least one predetermined engine parameter is vehicle speed, engine speed, engine load, engine temperature, or ambient air temperature.

47. A control system for a variable geometry turbocharger, having operatively connected turbine and compressor housings, for use in an internal combustion engine, the control system comprising:

an exhaust back pressure sensor able to generate an exhaust back pressure measurement signal;

a control device able to actuate a turbocharger nozzle; and a controller able to process the exhaust back pressure measurement signal and generate a control signal to the control device, based upon the exhaust back pressure measurement signal and at least one predetermined engine parameter, to thereby actuate the turbocharger nozzle;

wherein the controller is an electronic control module, an engine microprocessor, or a turbocharger microprocessor.

48. A control system for a variable geometry turbocharger, having operatively connected turbine and compressor housings, for use in an internal combustion engine, the control system comprising:

an exhaust, back pressure sensor able to generate an exhaust back pressure measurement signal;

a control device able to actuate a turbocharger nozzle; and a controller able to process the exhaust back pressure measurement signal and generate a control signal to tie control device, based upon the exhaust back pressure measurement signal and at least one predetermined engine parameter, to thereby actuate the turbocharger nozzle;

wherein the measurement signal is electronic, magnetic or optical.

* * * * *